United States Patent
Tanaka (10) Patent No.: US 8,570,560 B2
(45) Date of Patent: Oct. 29, 2013

(54) IMAGE PROCESSING APPARATUS CHANGING AN OPERATING MODE TO AN ADJUSTMENT MODE AND CONTROL PROGRAM CAUSING THE SAME

(75) Inventor: Kazuyoshi Tanaka, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 713 days.

(21) Appl. No.: 12/573,388

(22) Filed: Oct. 5, 2009

(65) Prior Publication Data

US 2010/0085584 A1    Apr. 8, 2010

(30) Foreign Application Priority Data

Oct. 8, 2008  (JP) ................................ 2008-261982

(51) Int. Cl.
G06F 3/12        (2006.01)
H04N 1/46        (2006.01)

(52) U.S. Cl.
USPC ........... 358/1.15; 358/1.14; 358/504; 710/15; 710/16; 710/14; 710/40; 710/62; 347/19

(58) Field of Classification Search
USPC ........ 358/504, 1.13, 1.9, 14.6, 1.14; 382/167; 399/85, 49; 710/15, 16, 14, 40, 62, 64
See application file for complete search history.

(56) References Cited

U.S. PATENT DOCUMENTS

| | | | | |
|---|---|---|---|---|
| 5,471,313 A | * | 11/1995 | Thieret et al. | 358/296 |
| 5,852,743 A | * | 12/1998 | Yeh | 710/18 |
| 6,301,011 B1 | * | 10/2001 | Fung et al. | 358/1.15 |
| 6,915,368 B2 | * | 7/2005 | Lin | 710/302 |
| 6,999,890 B2 | * | 2/2006 | Kai | 702/122 |
| 7,743,390 B2 | * | 6/2010 | Cheng | 719/327 |
| 2003/0214686 A1 | * | 11/2003 | Saito et al. | 358/504 |
| 2004/0150709 A1 | * | 8/2004 | Shimoji | 347/236 |

FOREIGN PATENT DOCUMENTS

| | | |
|---|---|---|
| JP | 03-231766 A | 10/1991 |
| JP | 2003-338939 A | 11/2003 |
| JP | 2004-233707 A | 8/2004 |
| JP | 2005-027276 A | 1/2005 |

OTHER PUBLICATIONS

Maeda Ryota, Image Forming Apparatus, (JP 2004-233707) Computer Generated English Translation.*

Japanese Notice of Reasons for Refusal dated Aug. 17, 2012 issued in the corresponding Japanese Patent Application No. 2008-261982 and English translation.

* cited by examiner

*Primary Examiner* — Twyler Haskins
*Assistant Examiner* — Dennis Dicker
(74) *Attorney, Agent, or Firm* — Buchanan Ingersoll & Rooney PC

(57) ABSTRACT

An image processing apparatus that has an interface section for connecting a measuring instrument and is capable of changing an operating mode to an adjustment mode in which an adjustment is carried out by using the results of measurements by the measuring instrument, the image processing apparatus comprising a control section detecting whether the measuring instrument is connected to the interface section, and when the measuring instrument is detected, changing the operating mode to the adjustment mode.

10 Claims, 10 Drawing Sheets

61: AUTHENTICATION SCREEN

PLEASE ENTER YOUR USER ID AND PASSWORD.

USER ID

PASSWORD

FIG. 11b

62: PERMISSION SCREEN

YOU ARE A PERMITTED USER. PLEASE CARRY OUT ADJUSTMENT PROCESSING.

FIG. 11c

63: DENIAL SCREEN

SINCE YOU ARE NOT A PERMITTED USER, YOU CANNOT CARRY OUT ADJUSTMENT PROCESSING.

FIG. 15a  65: CAUTION PROMPTING SCREEN

PRESCRIBED TIME HAS ELAPSED SINCE PREVIOUS ADJUSTMENT.
PLEASE CARRY OUT ADJUSTMENT PROCESSING.

FIG. 15b  66: WARNING SCREEN

PLEASE CARRY OUT ADJUSTMENT IMMEDIATELY.
THE NORMAL PROCESSING WILL BE INTERRUPTED UNTIL ADJUSTMENT IS CARRIED OUT.

IMAGE PROCESSING APPARATUS CHANGING AN OPERATING MODE TO AN ADJUSTMENT MODE AND CONTROL PROGRAM CAUSING THE SAME

RELATED APPLICATION

The present application is based on Patent Application No. 2008-261982 filed at the Japan Patent Office on Oct. 8, 2008 and which is hereby incorporated herein in its entirety.

TECHNICAL FIELD

The present invention relates to image processing apparatuses and control programs, and in particular to image processing apparatuses to which measuring instruments are connected and the to control programs that control the operation of such image processing apparatuses.

BACKGROUND

Image processing apparatuses such as Multi Function Peripherals (MFPs) or copying machine which are provided with color printing functions are coming into wide use. In such image processing apparatuses, the processings are carried out of forming an image based on the print data, forming an electrostatic latent image on a charged photoreceptor by impinging it with light according to the image, developing it by making charged toner get adhered to it, and transferring that toner image to a sheet via an intermediate image transfer member such as a transfer roller or a transfer belt.

In the above image processing apparatus, adjustment is necessary in order to transfer accurately on to the sheet the image instructed by the print data, and in particular, in image processing apparatuses that carry out product printing which are required to output accurate prints, it is necessary, for example, to carry out advanced adjustments such as adjusting the positions at the front and back surfaces to accuracies of several fractions of a millimeter, or to adjust the color difference to a level that cannot be detected visually, etc. Since such advanced adjustments cannot be made visually, special measuring instruments (color measuring instruments, density measuring instruments, digitizers, etc.) are used to carry out color compensation, density compensation, position correction, etc. (these are collectively called "calibration").

Regarding the above color compensation, an image forming method has been disclosed, for example, in Japanese Unexamined Patent Application Publication No. 2005-27276, in which a prescribed test chart is formed on the image transfer member, the test chart is detected by a chromaticity detection section, the result of measuring the test chart by the measuring instrument is stored, and, based on the detected result and the stored result of measurement, the detection error of the chromaticity detection section is corrected.

The measurements for calibration do not directly measure the accuracy of the image processing apparatus, but a sheet (hereinafter referred to as a patch sheet) is output in which specific patterns (in the case of color compensation, patterns with density variations for each of the colors of Yellow, Magenta, Cyan, and Black, which patterns are referred to hereinafter as measurement patches) are printed out at prescribed positions, and the shifts are verified by measuring this patch sheet using measuring instruments such as a color measuring instrument, a density measuring instrument, a digitizer, etc., and these shifts are fed back to the image processing apparatus as parameters thereby ensuring that the target values are reached.

Therefore, various complicated operations become necessary in order to carry out calibration, such as, to begin with, the measuring person operating the image processing apparatus and outputting the patch sheet corresponding to the measuring instrument, setting that patch sheet in the measuring apparatus, carrying out measurement of the patch sheet by operating the measuring instruments, and after that, operating the image processing apparatus and inputting the measurement results of the patch sheet. Further, since these operations are made by the measuring person himself or herself, there were that problems that a patch sheet was output that did not correspond to the measuring instrument or the measurement results were input wrongly, etc.

The present invention was made in view of the above problems, and the main purpose of the present invention is to provide an image processing apparatus and a control program by which it is possible to carry out adjustments easily as well as definitely using a measuring instrument.

SUMMARY OF THE INVENTION

One aspect of the present invention is to provide an image processing apparatus that has an interface section for connecting a measuring instrument and is capable of changing an operating mode to an adjustment mode in which an adjustment is carried out by using the results of measurements by the measuring instrument, the image processing apparatus comprising a control section detecting whether the measuring instrument is connected to the interface section, and when the measuring instrument is detected, changing the operating mode to the adjustment mode.

DESCRIPTION OF THE PREFERRED EMBODIMENTS

As was indicated in the background technology, in an image processing apparatus there was the problem that, while adjustments such as color correction, density correction, and position correction, etc., are necessary, in order to carry out such adjustments, it was necessary for the user to operate the image processing apparatus to change the operating mode to adjustment mode, or to output a patch sheet for making measurements by the measuring instruments, or to input the results of measurements made by the measuring instruments, and these operations were not only complicated but also were the cause of wrong operations.

Among the above operations, as a method of making simple the operation of inputting the measurement results, there is the method of connecting the image processing apparatus and the measuring instruments using a Universal Serial Bus (USB), etc., and transmitting the result of measurements made by the measuring instruments to the image processing apparatus via the USB bus.

However, even if the method is adopted of transmitting the measurement results via a USB bus, it is necessary for the user to carry out personally the different operations of changing the operating mode of the image processing apparatus to the adjustment mode, instructing to output a patch sheet according to the measuring instrument, and instructing the reading in of the patch sheet measurement results.

In view of this, in the embodiments, the above problem is solved by providing in the image processing apparatus a connection detection section that detects the connection with a measuring instrument, and an adjustment control section that changes the operating mode to the adjustment mode, instructs the outputting of a patch sheet corresponding to the measuring instrument the connection with which is detected, and carries out adjustment by taking in the results of measurements of a patch sheet.

Preferred Embodiment 1

Figure 1:
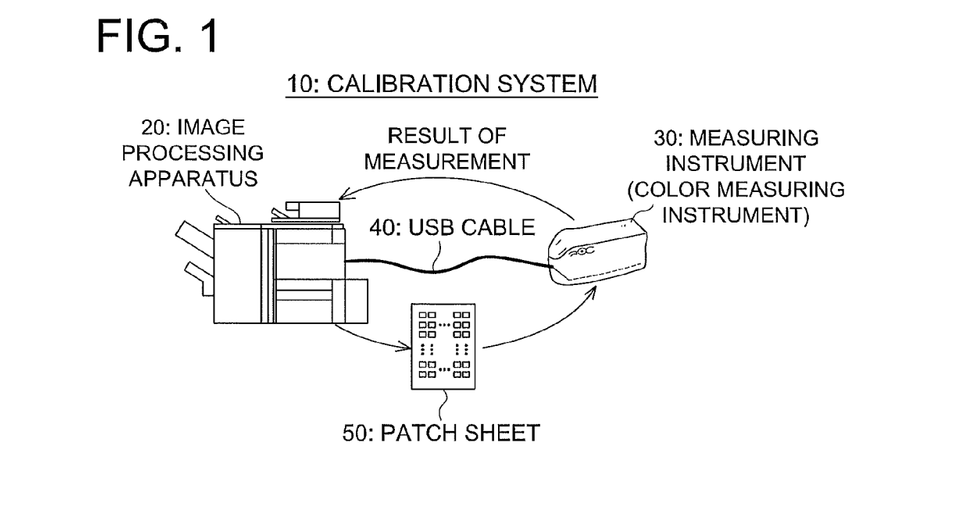
FIG. 1 is a diagram showing the configuration of a calibration system according to a first preferred embodiment.
Figure 2:
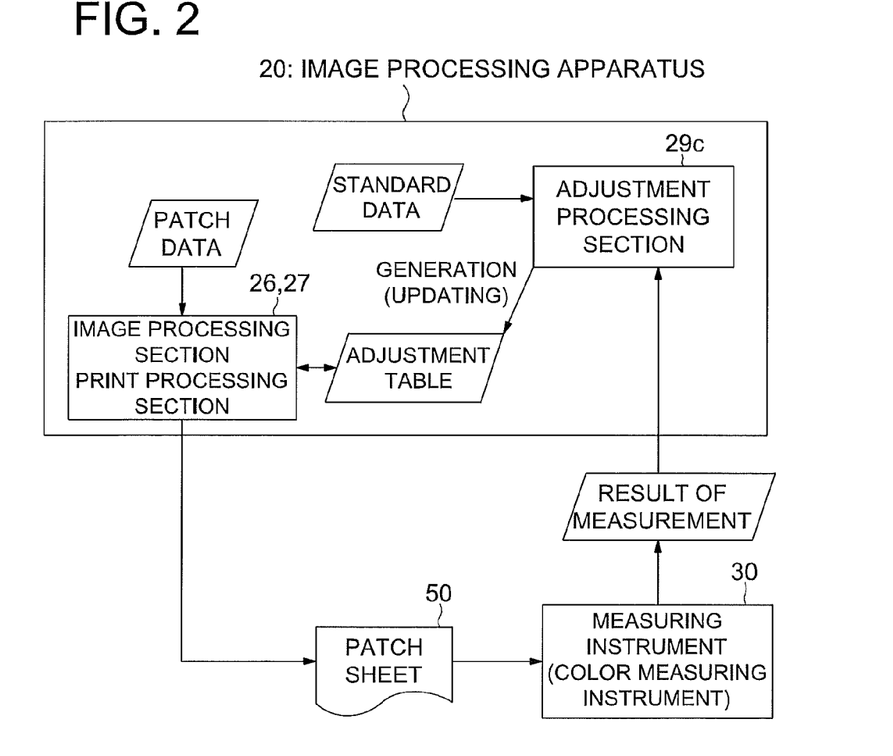
FIG. 2 is a diagram showing the outline operation of a calibration system according to a first preferred embodiment.
Figure 3:
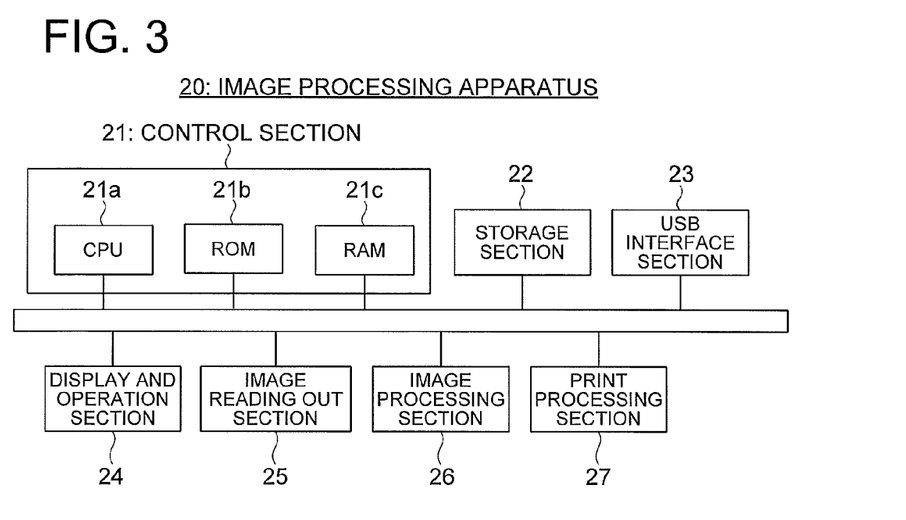
FIG. 3 is a block diagram showing the configuration of an image processing apparatus according to a first preferred embodiment.
Figure 4:
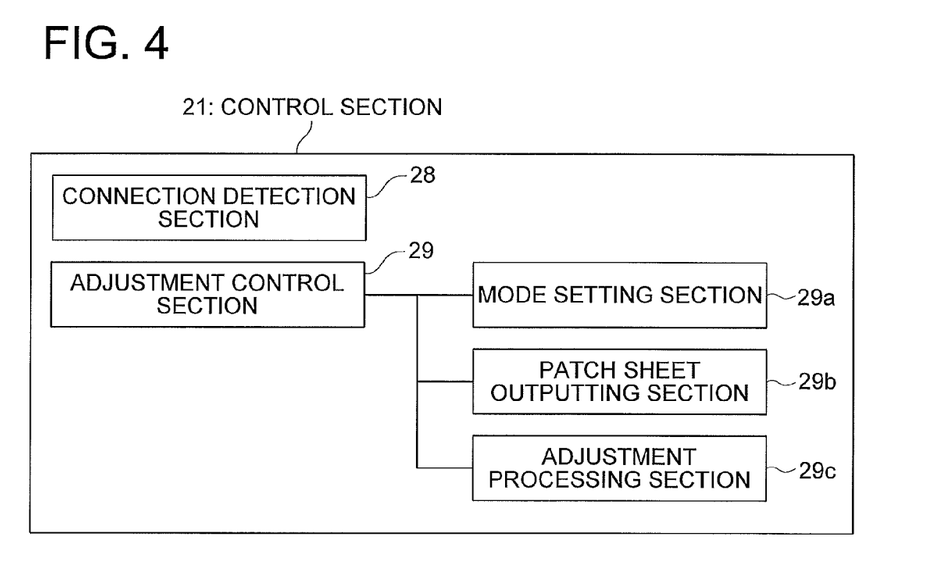
FIG. 4 is a block diagram showing the configuration of the control section of an image processing apparatus according to a first preferred embodiment.
Figure 5:
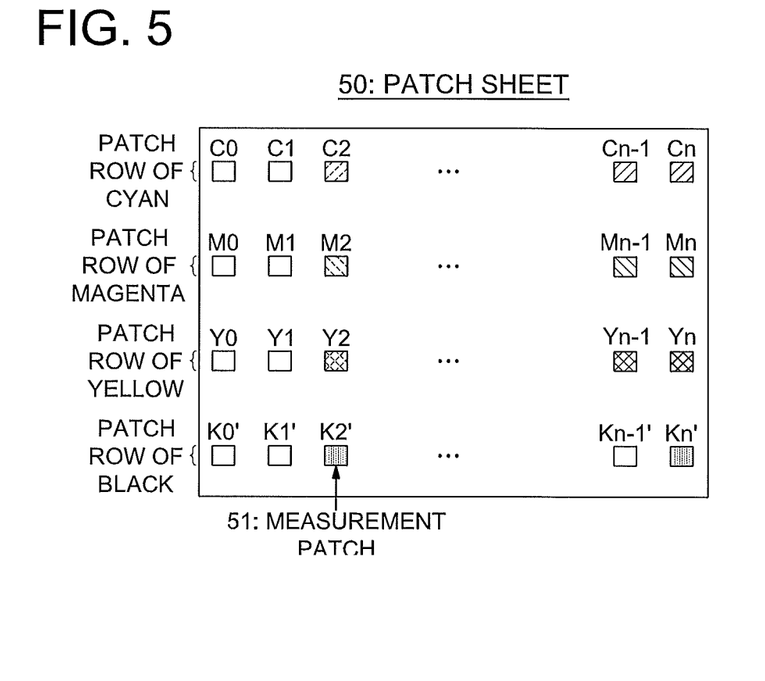
FIG. 5 is a diagram showing a sample configuration of a patch sheet according to a first preferred embodiment.
Figure 6:
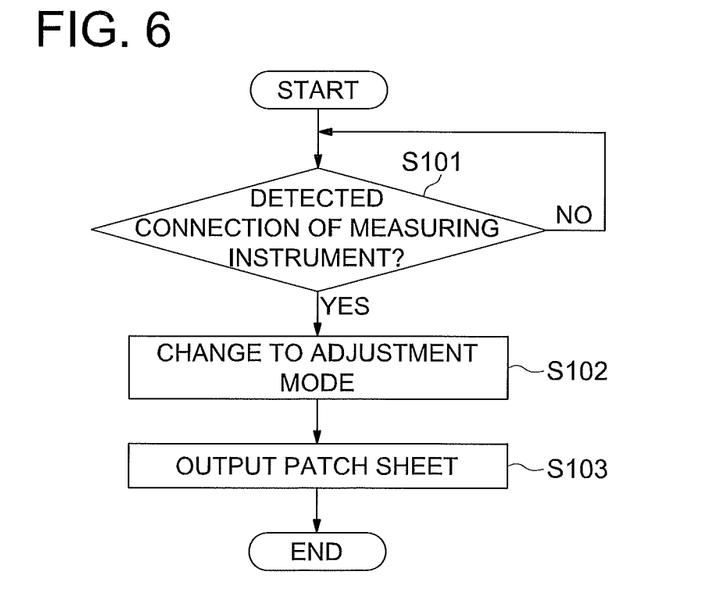
FIG. 6 is a flow chart showing the operation of an image processing apparatus (operation of outputting a patch sheet) according to a first preferred embodiment.
Figure 7:
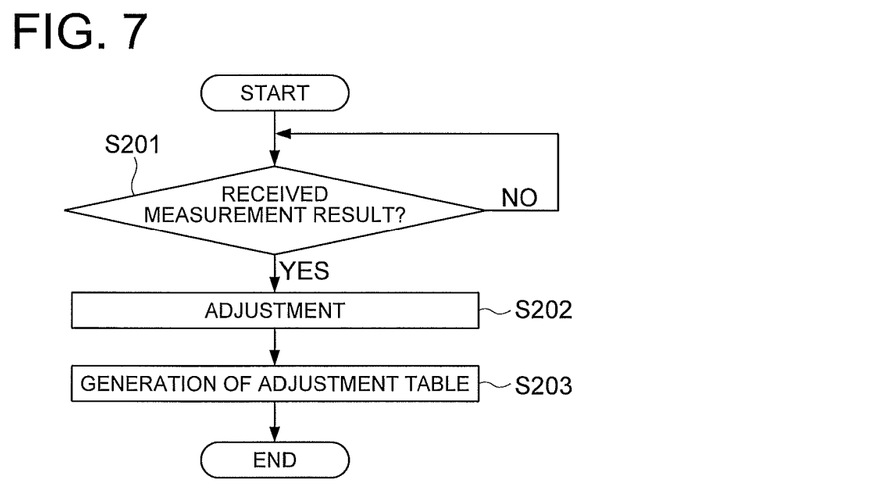
FIG. 7 is a flow chart showing the operation of an image processing apparatus (operation of adjusting based on the measurement results) according to a first preferred embodiment.
Figure 8:
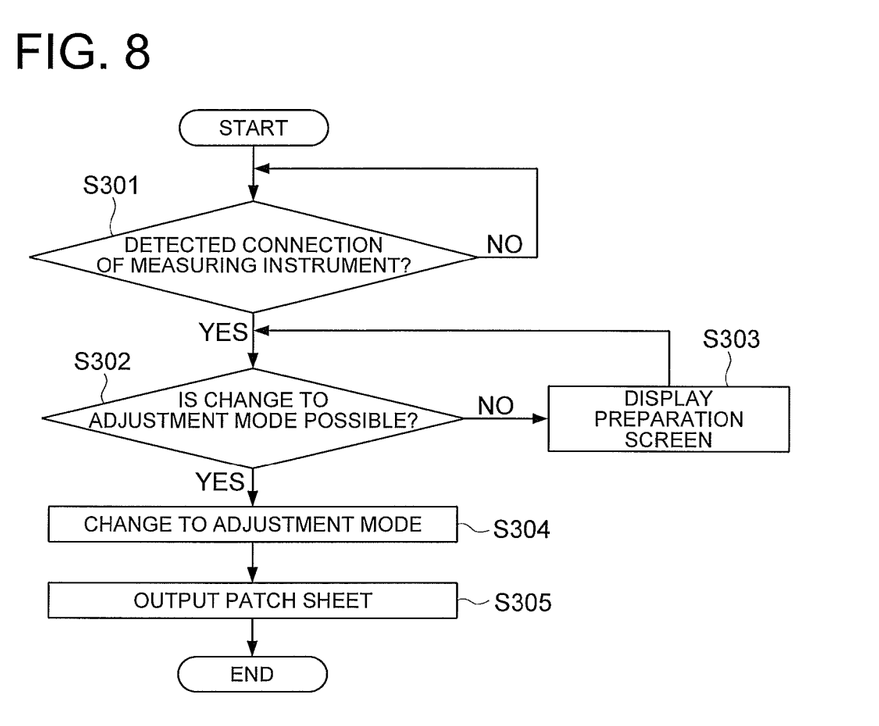
FIG. 8 is a flow chart showing another example of the operation of an image processing apparatus according to a first preferred embodiment.
Figure 9:
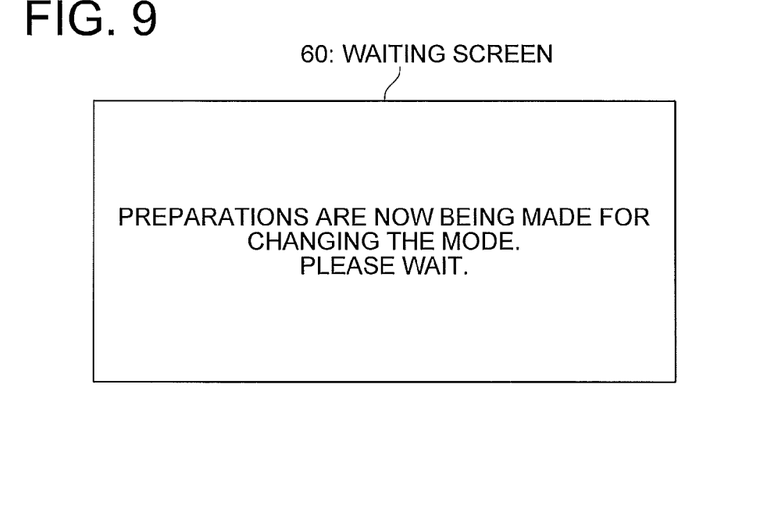
FIG. 9 is a diagram showing an example of the structure of the screen displayed in the display section of an image processing apparatus according to a first preferred embodiment.

In order to explain in further detail a preferred embodiment of the present invention, the image processing apparatus and control program according to a first preferred embodiment of the present invention are explained here referring to FIGS. 1 to 9. FIG. 1 is a diagram showing the schematic configuration of a calibration system according to the present preferred embodiment and FIG. 2 is a diagram showing the outline operation of the calibration system. Further, FIG. 3 is a block diagram showing the configuration of an image processing apparatus, FIG. 4 is a block diagram showing the configuration of the control section of the image processing apparatus, and FIG. 5 is a diagram showing a sample configuration of a patch sheet. Further, FIGS. 6 to 8 are flow charts showing the operations of the image processing apparatus according to the present preferred embodiment, and FIG. 9 is a diagram showing an example of the screen displayed in the image processing apparatus.

As is shown in FIG. 1 and FIG. 2, the calibration system 10 according to the present preferred embodiment is provided with an image processing apparatus 20 that outputs a patch sheet 50 and carries out adjustment based on the results of measurement of that patch sheet 50, and a measuring instrument 30 (which here is a color measuring instrument) that measures the patch sheet 50 and outputs the results of measurement to the image processing apparatus 20. These are connected together using a USB cable or a dedicated cable, network interconnection, etc., (here, the USB cable 40 is shown). Each of the apparatuses will be explained in detail below.

Image Processing Apparatus:

As is shown in FIG. 3, the image processing apparatus 20 is configured to have a control section 21, a storage section 22, an USB interface section 23, a display and operation section 24, an image reading out section 25, an image processing section 26, a print processing section 27, etc., which are all connected together via a bus.

The control section 21 is configured to have a CPU (Central Processing Unit) 21a, a ROM (Read Only Memory) 21b, and a RAM (Random Access Memory) 21c, etc. The ROM 21b stores the programs for controlling the entire image processing apparatus and the data necessary for control. The RAM 21c stores the data necessary for control by the CPU 21a and the data that need to be stored temporarily during the control operation. Further, the CPU 21a controls the operation of the entire image processing apparatus in coordination with the ROM 21b and the RAM 21c.

Further, the control section 21, as is shown in FIG. 4, functions also as a connection detection section 28 and an adjustment control section 29. The connection detection section 28 detects that a measuring instrument 30 that can be connected via a USB cable has been connected to the USB I/F section 23. The adjustment control section 29 is configured to have a mode setting section 29a, a patch sheet outputting section 29b, and an adjustment processing section 29c, etc. The mode setting section 29a, when the connection detection section 28 detects the connection of a measuring instrument 30, changes the operating mode of the image processing apparatus 20 from the normal mode (for example, the printing mode, etc.,) to the adjustment mode. The patch sheet outputting section 29b makes the print processing section 27 print out a printed material (for example, a patch sheet 50, etc., in which measurement patches 51 of different colors are arranged as is shown in FIG. 4) making the measuring instrument 30 that was detected by the connection detection section 28 carry out the measurements. The adjustment processing section 29c acquires the results of measurements made of the patch sheet 50 by the measuring instrument 30, carries out calibration by comparing it with the standard data that has been stored in advance, and generates an adjustment table for eliminating any shifts.

Further, it is also possible to configure the connection detection section 28 and the adjustment control section 29 as hardware, or to have a configuration of a control program that makes the computer function as the connection detection section 28 and the adjustment control section 29, and to make that control program operate in that control section 21.

The storage section 22 is configured using an HDD (Hard Disk Drive), etc. In the present preferred embodiment, this section stores the print data (called the patch data) for making the print processing section 27 print out a patch sheet 50, the standard data (for example, data indicating the densities that should actually be output for each of the gradation values of the image, etc.), the adjustment table (for example, a table describing the density offset values for each color in order to make corrections matching with the density characteristics of the image processing apparatus 20 so that the printing is done with the densities specified in the standard data).

The USB I/F section 23 is configured using a USB port, etc., is carries out communication with the measuring instrument 30.

The display and operation section 24 is configured using a display section such as an LCD (Liquid Crystal Display), etc., and an operation section such as a touch panel that covers the display section, and not only displays icons or button keys, etc., in the LCD, etc., in accordance with the display signals from the CPU 21a, but also outputs the operation signals input from the touch panel, etc., to the CPU 21a. Further, it is possible to configure the display and operation section 24 as a single integrated unit, or to configure it by separating the display section and the operation section.

The image reading out section 25 is configured to have a light source that scans the original document, sensors that detect the different colors such as CCD (Charge Coupled Device) image sensors, etc., that convert the light reflected from the original document into electrical signals, and an A/D converter that A/D converts the electrical signals to generate the image data, etc.

The image processing section 26 analyzes the print data obtained from a client connected to the communication network, and generates an image data in the bit map format. Further, it is also possible to have a configuration in which the processing of the image processing section 26 is carried out by an RIP (Raster Image Processor) controller that is connected to the network, and in that case, it is sufficient to analyze the print data using the RIP controller, generate the image data in the bit map format and transmit it to the image processing apparatus 20.

The print processing section 27 transfers to a sheet an image formed according to an electro photographic process based on the image data prepared by the image processing section 26 and the patch data that has been stored in advance in the storage section 22. In concrete terms, this is configured to have a writing unit (not shown in the figure) that carries out exposure by emitting laser light based on the image data or the patch data, a photoreceptor unit that is provided with a photoreceptor drum, a developing unit, a charging unit, a photoreceptor cleaning unit, and a primary image transfer roller, and that forms toner images of the different colors of yellow (Y), magenta (M), cyan (C), and black (K), an intermediate image transfer belt that functions as an intermediate image transfer member that transports on to a sheet the toner images formed in the photoreceptor unit, and a secondary image transfer roller that transfers the toner image formed on the intermediate image transfer belt on to a sheet, a fixing unit that fixes the toner image transferred on to a sheet, and a conveying section having a sheet feeding roller that conveys the desired sheet from a sheet tray, a registration roller, loop roller, inverting roller, sheet discharging roller, etc.

Measuring Instrument (Color Measuring Instrument):

The color measuring instrument 30 is configured to have a color measuring section and an USB I/F section, etc. (not shown in the figure).

The color measuring section is provided with three types of sensors corresponding to, for example, the three fundamental colors of light of red, green, and blue, and measures the colors based on the output values (RGB values) from the three types of sensors corresponding to the different parts of the color image, and converts the color measurement results into color measurement values in the form of L*a*b* data. Further, the color measuring instrument 30 can be a color hue measuring instrument using the excitation value direct reading method, or can be a spectral colorimeter using the spectral color measurement method.

The USB I/F section is configured to have USB ports, etc., and enables communication with the image processing apparatus 20. In the present preferred embodiment, the result of measuring the patch sheet 50 (color measurement values in the case of a color measuring instrument) is transmitted to the image processing apparatus 20 via this interface.

Further, although explanations were given here taking the example of a color measuring instrument as the measuring instrument 30, the measuring instrument 30 can be any equipment that can output the results of measurement that are utilized for carrying out adjustment of the image processing apparatus 20, and can be a density meter that reads out the density information, or can be a digitizer that reads out the position information, etc.

Patch Sheet:

As is shown in FIG. 5, the patch sheet 50 has printed on it measurement patches 51 for each of the colors yellow, magenta, cyan, and black of the toners (the difference in the colors is expressed here by changing the type of hatching) wherein the density of that color changes gradually along a prescribed direction (for example, the sheet feeding direction, or a direction at right angles to it).

Here, when carrying out calibration using the image processing apparatus 20 and the measuring instrument 30, to begin with, the user operates the image processing apparatus 20 and gives the instruction to output a patch sheet 50, and the print processing section 27 reads out the patch data suitable for the measuring instrument 30 from the patch data stored in advance in the storage section 22 and prints out the patch sheet 50.

Next, the user sets the patch sheet 50 that has been output in the measuring instrument 30, the measuring instrument 30 scans the patch sheet 50, and measures the measurement patches 51 of each color. Next, when the results of measurement are either input by the user in the image processing apparatus 20 or is transmitted to it, the adjustment processing section 29c generates the adjustment table by comparing the measurement results that have been input with the standard data that is stored in advance.

However, normally, this sequence of operations needs to be done manually. In other words, it is necessary to carry out the complicated operations of connecting the measuring instrument 30 to the image processing apparatus 20, changing the operating mode of the image processing apparatus 20 to the adjustment mode, giving instruction to output a patch sheet 50 corresponding to the connected measuring instrument 30, and taking the results of measurements made by the measuring instrument 30 into the image processing apparatus 20, etc., and this can be the cause of outputting a patch sheet 50 that is not suitable for the measuring instrument 30, or wrong operations such as wrong input of the measurement results, etc.

Here, in the present preferred embodiment, it has been made possible to detect automatically the connection with the measuring instrument 30, and to carry out adjustment in the image processing apparatus 20 both easily and definitely. In other words, by the user merely connecting the measuring instrument 30, the functions provided in the control section 21 of the image processing apparatus 20 judge that connection and change the operating mode to the adjustment mode, and output a patch sheet 50 that is suitable for the connected measuring instrument 30. In addition, the results of measuring the patch sheet 50 are obtained from the measuring instrument 30 and the adjustment table is generated.

Further, when the image processing apparatus 20 and the measuring instruments 30 are connected by USB cables, it is possible to detect the connection even when the measuring instrument 30 is connected while the power supply to the image processing apparatus 20 has already been switched ON. This function is called live plug in or hot plugging in, and is realized because the two power line terminals of a USB connector are longer than the signal line terminals and hence the power supply lines get connected a litter earlier than the signal lines. In addition, when network interconnections are used instead of the USB interconnections 50, it is possible to detect the connection by making function called broadcasting of searching for the equipment connected to the network at all times in the image processing apparatus 20.

In the following, referring to the flow charts of FIG. 6 and FIG. 7, the operations of the image processing apparatus 20 in the present preferred embodiment will be explained in detail.

To begin with, in Step S101 in FIG. 6, the control section 21 (the connection detection section 28) of the image processing apparatus 20 monitors whether or not the measuring instrument 30 is connected via the USB I/F section 23, and when the connection of the measuring instrument 30 is detected, in Step S102, the control section 21 (the mode setting section 29a) changes the operating mode of the image processing apparatus 20 to the adjustment mode, and prohibits the processing of the normal operating mode.

Next, in Step S103, the control section 21 (the patch sheet outputting section 29b) reads out from among the patch data stored in advance in the storage section 22, etc., the patch data corresponding to the connected measuring instrument 30 and transfers it to the print processing section 27, and the print processing section 27 outputs the patch sheet 50 based on the patch data.

After that, the user sets the patch sheet 50 that has been output in the connected measuring apparatus 30, operates the measuring apparatus 30 thereby carrying out the measurement of the patch sheet 50. Next, via the USB cable 40, that measurement result (for example, the color measurement values of the measurement patches 51) is transmitted to the image processing apparatus 20.

In the image processing apparatus 20, in Step S201 of FIG. 7, the control section 21 monitors the result of measurement transmitted from the measuring instrument 30, and when the measuring instrument is received, in Step S202, the control section 21 (the adjustment processing section 29c) carries out correction by comparing the standard data stored in the storage section 22, etc., with the received measurement results, and in Step S203, generates the adjustment table.

In this manner, when the connection detection section 28 detects the connection with the measuring instrument 30, since the mode setting section 29a changes the operating mode of the image processing apparatus 20 to the adjustment mode, and the patch sheet outputting section 29b automatically outputs a patch sheet 50 according to the corresponding to the measuring instrument 30, it is no longer necessary for the user to operate the image processing apparatus 20 personally and change the operating mode to the adjustment mode, or to give an instruction for outputting the patch sheet 50, and hence the ease of operation can be improved and wrong operations can be prevented.

Although the flow in FIG. 6 is the case in which the measuring instrument 30 is connected when the power supply of the image processing apparatus 20 is in the ON condition (the so called live plugging in), it is also possible to connect the measuring instrument 30 when the power supply of the image processing apparatus 20 is in the OFF condition. The operation in that case will be explained referring to FIG. 8 and FIG. 9.

After connecting in advance the measuring instrument 30 when the power supply of the image processing apparatus 20 is in the OFF condition, when the power supply of the image processing apparatus 20 is switched ON, in Step S301 of FIG. 8, the control section 21 (the connection detection section 28) of the image processing apparatus 20 monitors whether the measuring instrument 30 is connected via the USB I/F section 23, and when the connection of the measuring instrument 30 is detected, in Step S302, the control section 21 judges whether or not it is possible to change the operating mode to the adjustment mode. For example, for the image processing apparatus 20 to carry out printing, some warming up time is required to put the different parts of the print processing section 27 in the state in which operation is possible (for example, for heating the fixing unit to the prescribed temperature). In view of this, during the period until it is possible to change the operating mode to the adjustment mode, in Step S303, the control section 21 (the mode setting section 29a), for example, displays in the display and operating section 24 a waiting screen 60 such as the one shown in FIG. 9 thereby informing the user that preparations are being made for changing the mode.

Next, when it becomes possible to change the operating mode to the adjustment mode, in Step S304, the control section 21 (the mode setting section 29a) changes the operating mode of the image processing apparatus 20 to the adjustment mode, and in Step S305, the control section 21 (the patch sheet outputting section 29b) reads out from the storage section 22, etc., the patch data corresponding to the connected measuring instrument 30 and makes the print processing section 27 output the patch sheet.

In this manner, even if the measuring instrument 30 is connected when the power supply of the image processing apparatus 20 is in the OFF condition, since the operating mode is changed automatically to the adjustment mode when it becomes possible to change over to the adjustment mode, it is possible to enhance the convenience of the user.

Preferred Embodiment 2

Figure 10:
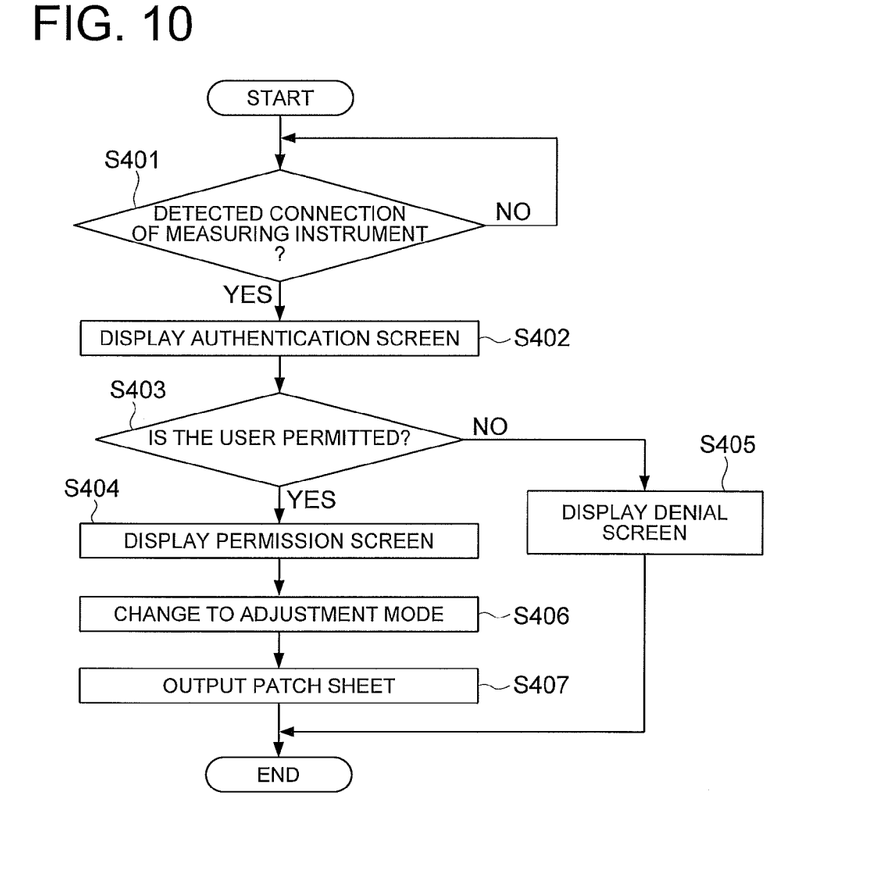
FIG. 10 is a flow chart showing the operation of an image processing apparatus according to a second preferred embodiment.

Next, the image processing apparatus and control program according to a second preferred embodiment of the present invention will be explained here referring to FIG. 10 and FIG. 11. FIG. 10 is a flow chart showing the operations of the image processing apparatus according to the present preferred embodiment, and FIG. 11 is a diagram showing an example of the screen displayed in the image processing apparatus.

While, in the first preferred embodiment described above, the configuration was one in which the change over to the adjustment mode was made automatically when the connection with the measuring instrument 30 is detected, if, for example, the mode is changed to the adjustment mode when a novice is operating the image processing apparatus 20, it is possible that some inappropriate adjustment is made. In view of this, in the present preferred embodiment, the mode setting section 29a is made to have the user authentication function and change over to the adjustment mode is made possible only when a specific user is using the apparatus.

Figure 11A:
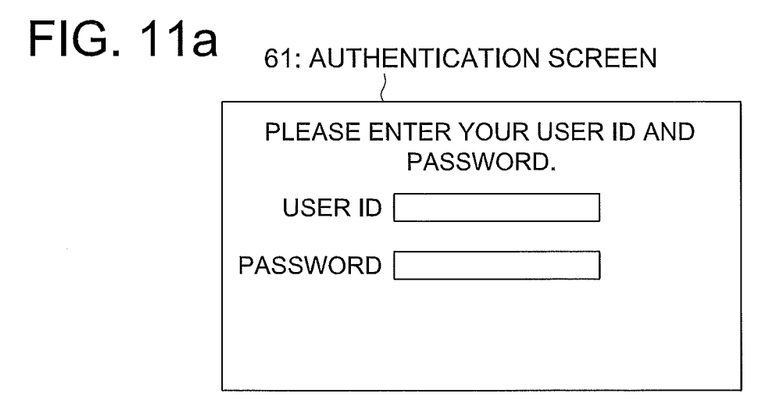
FIG. 11a is a diagram showing an example of the structure of the screen displayed in the display section of an image processing apparatus according to a second preferred embodiment.

The operation in that case will be explained referring to FIG. 10 and FIG. 11. To begin with, in Step S401 of FIG. 10, the control section 21 (the connection detection section 28) of the image processing apparatus 20 monitors whether or not the measuring instrument 30 is connected via the USB I/F section 23, and when the connection of the measuring instrument 30 is detected, in Step S402, the control section 21 (the mode setting section 29a) displays in the display and operation section 24, for example, an authentication screen 61 such as that shown in FIG. 11a and asks the user to input the user ID and password.

Figure 11B:
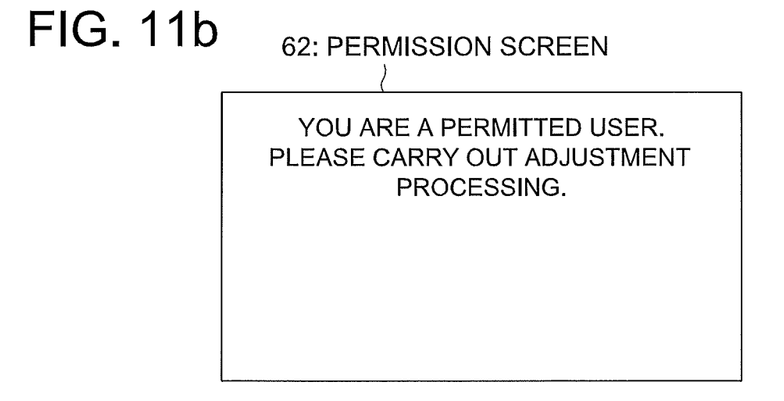
FIG. 11b is a diagram showing an example of the structure of the screen displayed in the display section of an image processing apparatus according to a second preferred embodiment.
Figure 11C:
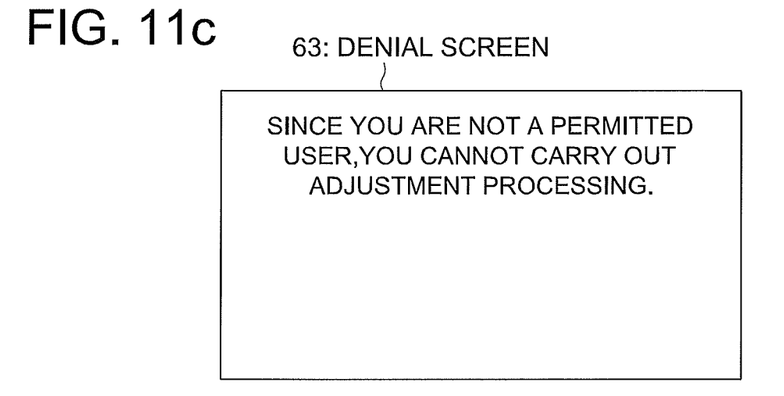
FIG. 11c is a diagram showing an example of the structure of the screen displayed in the display section of an image processing apparatus according to a second preferred embodiment.

Next, in Step S403, the control section 21 (the mode setting section 29a) carries out user authentication by comparing the user ID and password that have been input with the user information stored in advance in the storage section 22, etc., and in the case of a permitted user, in Step S404, after displaying in the display and operation section 24 a permission screen 62, for example, such as that shown in FIG. 11b, changes the operating mode to the adjustment mode in Step S406, and outputs the patch sheet 50 in Step S407. On the other hand, if the user is not a permitted user, in Step S405, for example, a denial screen 63 such as that shown in FIG. 11c is displayed informing the user that it is not possible to carry out adjustment.

In this manner, by permitting change to the adjustment mode only for specific users, since it is not possible to change to the adjustment mode even if any other user connects a measuring instrument 30, it is possible to prevent in advance any inappropriate adjustments by novice users.

Preferred Embodiment 3

Figure 12:
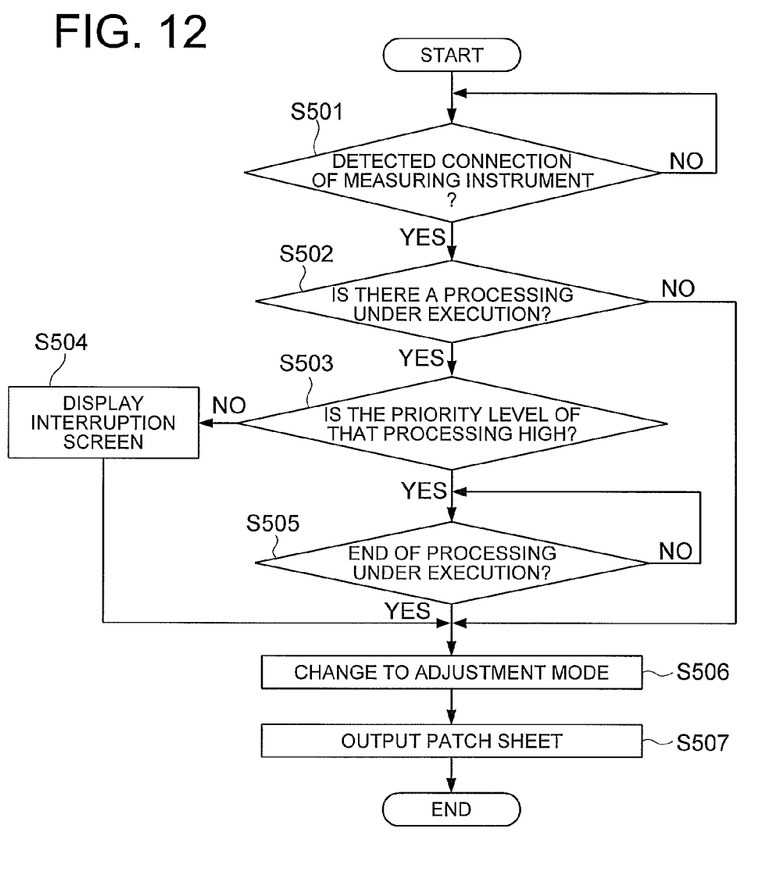
FIG. 12 is a flow chart showing the operation of an image processing apparatus according to a third preferred embodiment.
Figure 13:
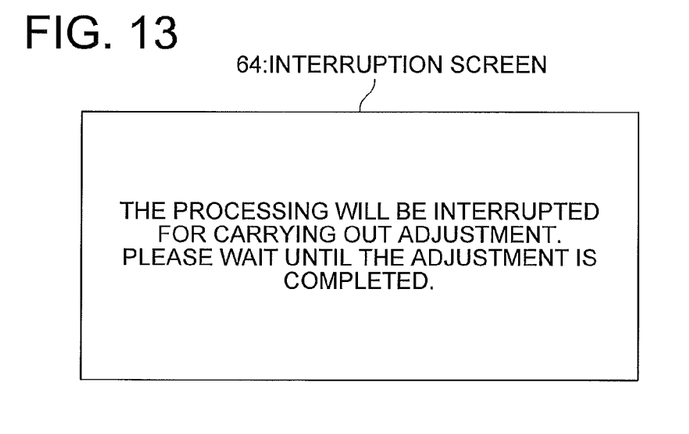
FIG. 13 is a diagram showing an example of the structure of the screen displayed in the display section of an image processing apparatus according to a third preferred embodiment.

Next, the image processing apparatus and control program according to a third preferred embodiment of the present invention will be explained here referring to FIG. 12 and FIG. 13. FIG. 12 is a flow chart showing the operations of the image processing apparatus according to the present preferred embodiment, and FIG. 13 is a diagram showing an example of the screen displayed in the image processing apparatus.

While, in the first and second preferred embodiments described above, the complexity of operations was reduced by changing over to the adjustment mode automatically when the connection with the measuring instrument 30 is detected, once the mode has been changed to the adjustment mode, operations in the normal mode are suspended until the sequence of operations for adjustment have been completed, and it is possible that the convenience of other users using the image processing apparatus 20 is lost. In view of this, in the present preferred embodiment, the mode setting section 29a, at the time of changing the operating mode to the adjustment mode, carries out judgments as to whether there is a processing that is currently under execution, and whether the priority level of that processing is high, etc., and restricts the changing over to the adjustment mode according to the results of those judgments.

The operations in this case will be explained referring to FIG. 12 and FIG. 13. To begin with, in Step S501 of FIG. 12, the control section 21 (the connection detection section 28) of the image processing apparatus 20 monitors whether or not the measuring instrument 30 is connected via the USB I/F section 23, and when the connection of the measuring instrument 30 is detected, in Step S502, the control section 21 (the mode setting section 29a) judges if there is a processing that is currently under execution. Next, if there is no processing that is currently under execution, in Step S506, it changes the operating mode to the adjustment mode, and in Step S507, a patch sheet 50 is output.

On the other hand, if there is a processing that is currently under execution, in Step S503, the control section 21 (the mode setting section 29a) judges whether the priority level of the processing that is currently being executed is high or not. For example, if a normal printing is being done, although no big problem occurs even if that processing is interrupted, when a specific user (a user with a specific designation, etc.,) is carrying out printing or when a confidential document is being printed out, if the processing is interrupted while the image reading out section 25 is reading out an original document, the convenience of that user is severely impeded. In view of this, a list of processings with high levels of priority is prepared in advance and stored in the storage section 22, etc., and the control section 21 (the mode setting section 29a), if the processing that is currently being executed does not correspond to the processings in this list, judges the processing to be a low priority level processing, and in Step S504, displays in the display and operation section 24, for example, an interruption posting screen 64 such as that shown in FIG. 13 thereby informing the user that the processing that is currently under execution has been temporarily halted.

On the other hand, if the processing that is currently being executed does correspond to the processings in the above list, the control section 21 (the mode setting section 29a) judges that the processing is one with a high priority level, and in Step S505, monitors the completion of the processing that is currently being executed, and when the processing that is currently being executed is completed, in Step S506, it changes the operating mode to the adjustment mode, and in Step S507, outputs a patch sheet.

In this manner, even if the connection detection section 28 detects the connection of a measuring instrument 30, by restricting the changing over to the adjustment mode if a processing is under execution that has to be given priority, it is possible to ensure that the convenience of other users using the image processing apparatus 20 is not lost.

Preferred Embodiment 4

Figure 14:
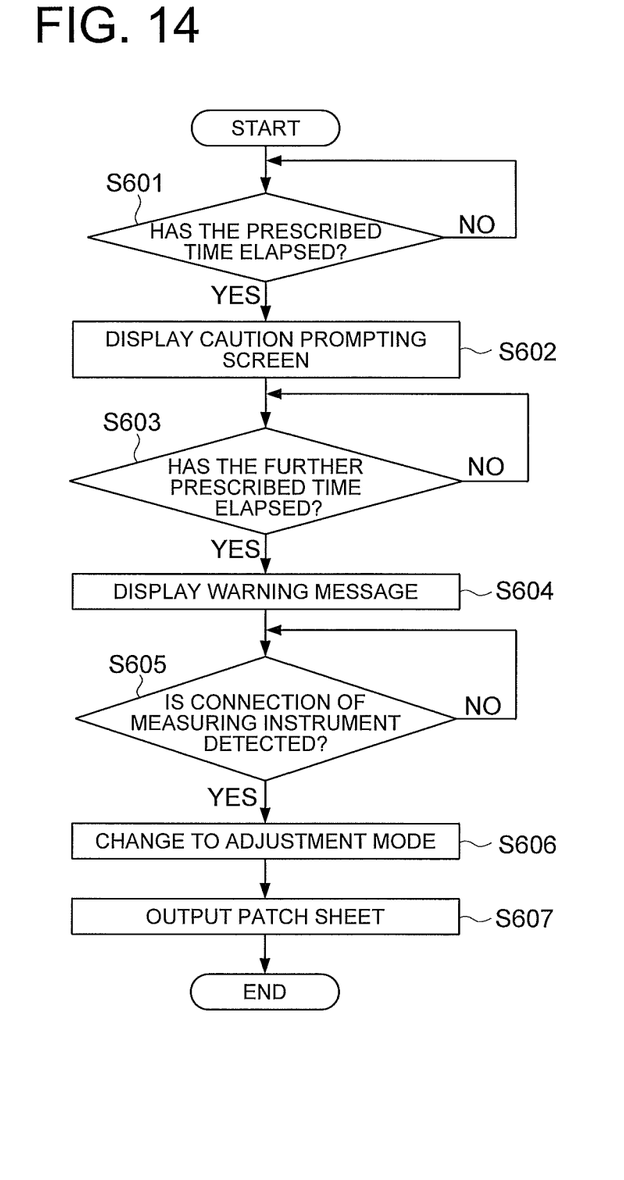
FIG. 14 is a flow chart showing the operation of an image processing apparatus according to a fourth preferred embodiment.

Next, the image processing apparatus and control program according to a fourth preferred embodiment of the present invention will be explained here referring to FIG. 14 and FIG. 15. FIG. 14 is a flow chart showing the operations of the image processing apparatus according to the present preferred embodiment, and FIG. 15 is a diagram showing an example of the screen displayed in the image processing apparatus.

While, in the first to third preferred embodiments described above, the configuration was one in which the change over to the adjustment mode was made when the connection with the measuring instrument 30 is detected, it is desirable that the adjustment operation is made at regular intervals (time elapsed, or number of prints made) in order to maintain the quality. In the present preferred embodiment, the control section 21 monitors the time that has elapsed or the number prints made ever since the last adjustment was made, and carries out adjustment at an appropriate time.

The operations in this case will be explained referring to FIG. 14 and FIG. 15. However, here, it is assumed that the control is carried out based on the time that has elapsed, and this time elapsed is assumed to be counted by a clock mechanism provided in the image processing apparatus 20.

Figure 15A:
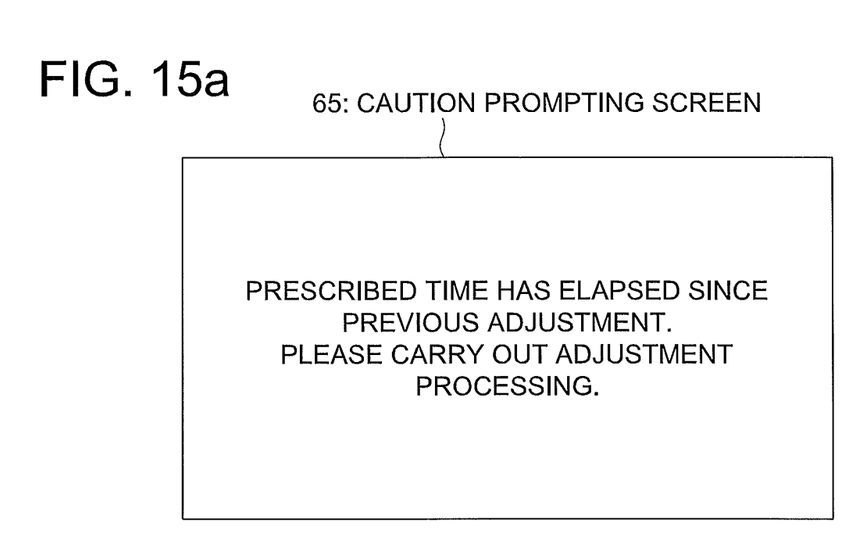
FIG. 15a is a diagram showing an example of the structure of the screen displayed in the display section of an image processing apparatus according to a fourth preferred embodiment.

To begin with, in Step S601 of FIG. 14, the control section 21 of the image processing apparatus 20 monitors the time that has elapsed since the previous adjustment was made, and if the time elapsed becomes equal to a first prescribed time that has been determined in advance, in Step S602, makes the display and operation section 24 display, for example, a caution prompting screen 65 such as that shown in FIG. 15a, thereby prompting the user to carry out adjustment. Further, although an example in which the caution prompting screen is displayed in the entire screen has been shown in FIG. 15a, since it is desirable that this caution prompting information is displayed even when other work is being executed, it is also possible, for example, to display this information in the screen during normal operation.

Figure 15B:
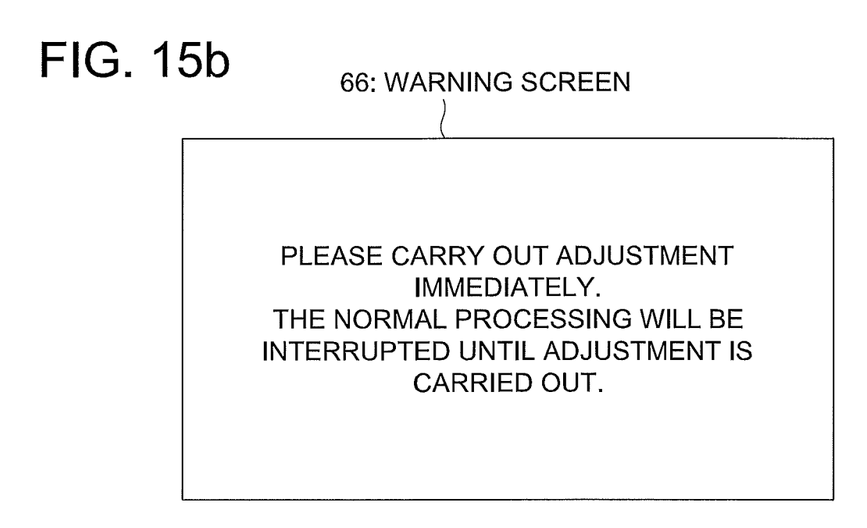
FIG. 15b is a diagram showing an example of the structure of the screen displayed in the display section of an image processing apparatus according to a fourth preferred embodiment.

Next, in Step S603, the control section 21 continues to monitor the time elapsed even after displaying the caution prompting screen 65 (or since the previous adjustment was made), and when the time elapsed becomes equal to a second prescribed time that has been determined in advance, in Step S604, makes the display and operation section 24 display, for example, a warning screen 66 such as that shown in FIG. 15b, but also prohibit the processing in the normal operating mode in order to maintain the print quality of the image processing apparatus 20.

Further, in Step S605, the control section 21 (the connection detection section 28) of the image processing apparatus 20 monitors whether or not the measuring instrument 30 is connected via the USB I/F section 23, and when the connection of the measuring instrument 30 is detected, the control section 21 (the mode setting section 29a), in Step S606, changes the operating mode to the adjustment mode, and in Step S607, outputs a patch sheet 50.

In this manner, by monitoring the time elapsed or the number of prints made since the previous adjustment was made, and when a prescribed time has elapsed or when a prescribed number of prints have been made, by prompting the user to carry out adjustment, or by prohibiting the processing in the normal operating mode, it is possible to cause adjustment to be made appropriately.

Preferred Embodiment 5

Figure 16:
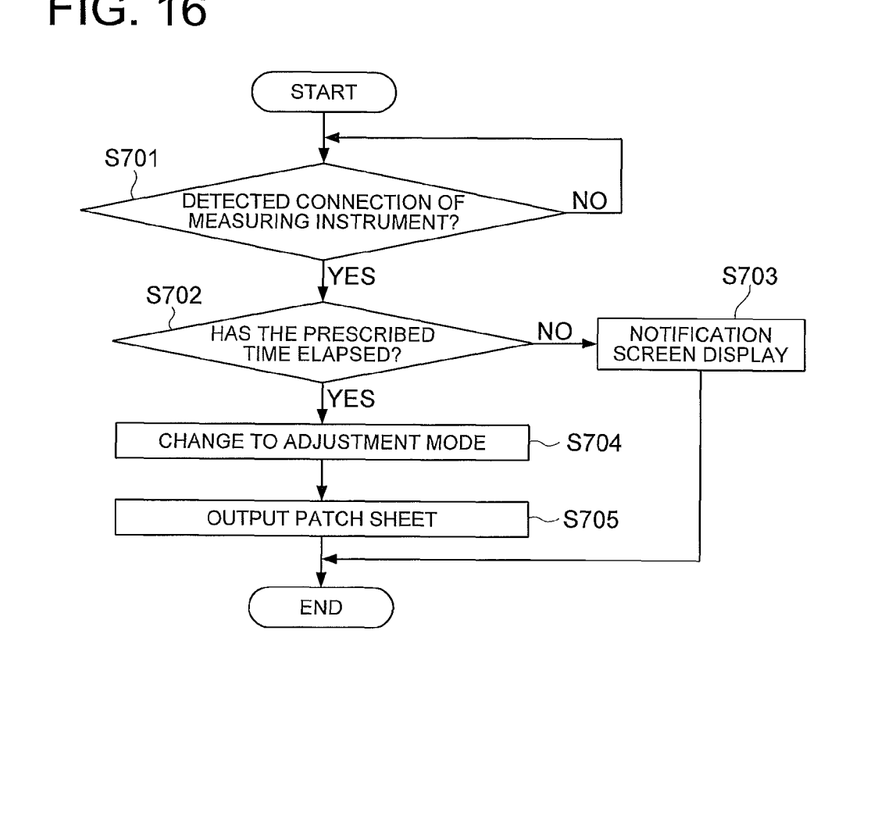
FIG. 16 is a flow chart showing the operation of an image processing apparatus according to a fifth preferred embodiment.

Next, the image processing apparatus and control program according to a fifth preferred embodiment of the present invention will be explained here referring to FIG. 16 and FIG. 17. FIG. 16 is a flow chart showing the operations of the image processing apparatus according to the present preferred embodiment, and FIG. 17 is a diagram showing an example of the screen displayed in the image processing apparatus.

While in the above fourth preferred embodiment, the configuration was one in which prompting for adjustment to be made was done based on the time elapsed or the number of prints made, it is not desirable that the adjustment is made at very short intervals because the processing in the normal operating mode will be delayed, or because the patch sheets 50 are output wastefully. In view of this, in the present preferred embodiment, the control section 21 monitors the time elapsed or the number of sheets printed out ever since the previous adjustment was made, and causes the adjustments to be made at appropriate times.

The operations in this case will be explained referring to FIG. 16 and FIG. 17. However, here, it is assumed that the control is carried out based on the time that has elapsed, and this time elapsed is assumed to be counted by a clock mechanism provided in the image processing apparatus 20.

Figure 17:
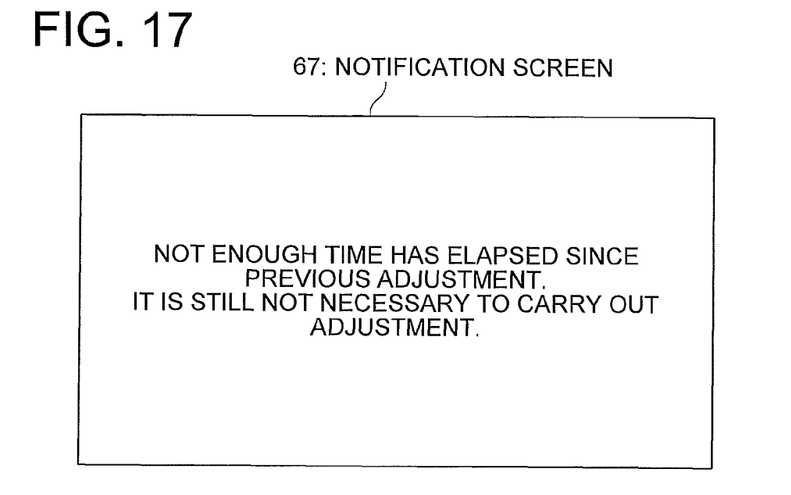
FIG. 17 is a diagram showing an example of the structure of the screen displayed in the display section of an image processing apparatus according to a fifth preferred embodiment.

To begin with, in Step S701 of FIG. 16, the control section 21 (the connection detection section 28) of the image processing apparatus 20 monitors whether or not the measuring instrument 30 is connected via the USB I/F section 23, and when the connection of the measuring instrument 30 is detected, in Step S702, the control section 21 obtains the time elapsed since the previous adjustment was made, and if the time elapsed has not reached the prescribed time interval that has been determined in advance, in Step S703, it displays in the operation and display section 24, for example, a notification screen 67 such as the one shown in FIG. 17, and informs the user that adjustment is not necessary.

On the other hand, if the elapsed time has exceeded the prescribed time, the control section 21 (the mode setting section 29a), in Step S703, changes the operating mode to the adjustment mode, and in Step S704, it outputs the patch sheet 50.

In this manner, by monitoring the time elapsed or the number of prints made ever since the previous adjustment was made, and, if the measuring instrument 30 is connected when the prescribed time has not elapsed or the prescribed number of prints have not been made, by informing the user that adjustment is not necessary, it is possible to cause the adjustments to be made appropriately.

Although in the above the methods of carrying adjustments were explained in the different preferred embodiments, it is also possible to store as management log all the results of these adjustments due to automatic connection, and it is possible to store the various information such as the information identifying the measuring instrument 30, the results of measurements, the details of adjustments made, the date and time when the adjustment was made, etc., in the storage section 22, or to transfer to another equipment (for example, a print server, or a management apparatus, etc.,) that is connected via a communication network. Because of this, it becomes possible to grasp comprehensively the history of the deviations in adjustment, etc., and can be used for determining the maintenance policy, or as guidelines for design changes, etc.

Further, although in each of the above preferred embodiments, the cases described were those of connecting a measuring instrument 30 to the image processing apparatus 20, the present invention shall not be restricted to these preferred embodiments, and it is possible that the results of processing done in the apparatus that is connected (any equipment corresponding to the measuring instrument 30) can be applied similarly to any system in which the results are used in the apparatus to which the connection is made (any equipment corresponding to the image processing apparatus 20).

According to the image processing apparatus and control program of the above embodiments, it is possible to carry out adjustment easily and definitely using a measuring instrument.

The reason for this is that control is carried out so that when a measuring instrument is connected to the image processing apparatus, in the image processing apparatus, the connection with the measuring instrument is recognized, its own mode of operation is changed to the adjustment mode of carrying out adjustment based on the results of measurements made using the connected measuring instrument, and a printed material is output for causing measurements to be made by the measuring instrument.

Further, when the connection with a measuring instrument is recognized, the reason for this is that when the connection with a measuring instrument is recognized, control is carried out such as restricting the change over to the adjustment mode based on the result of user authentication, or restricting the change over to the adjustment mode according to the presence or absence or according to the order or priority of a process under execution, or to carry out adjustment according to an appropriate time based on the time that has elapsed or the number of pages printed out since the execution of the previous adjustment, etc.

What is claimed is:

1. An image processing apparatus that has an interface section for connecting a measuring instrument and is capable of changing an operating mode to an adjustment mode in which an adjustment is carried out by using the results of measurements by the measuring instrument, the image processing apparatus comprising:
    a control section detecting whether the measuring instrument is connected to the interface section, and when the measuring instrument is detected, changing the operating mode to the adjustment mode,
    wherein the control section judges whether there is a processing under execution at the time of detecting the connection with the measuring instrument, changes the operating mode to the adjustment mode after the execution of the processing under execution is completed when the processing under execution is a particular processing that is determined in advance, and halts the operating mode under execution to change the operating mode to the adjustment mode when the processing under execution is not the particular process that is determined in advance.

2. The image processing apparatus of claim 1,
    wherein the control section instructs an output of a printed material for carrying out measurements by the measuring instrument, after detecting the connection with the measuring instrument.

3. The image processing apparatus of claim 1,
    wherein the control section carries out user authentication, and, when the user is authorized, changes the operating mode to the adjustment mode, after detecting the connection with the measuring instrument.

4. The image processing apparatus of claim 1,
    wherein the measuring instrument is one of a color measuring instrument, a density measuring instrument, and a digitizer.

5. An image processing apparatus that has an interface section for connecting a measuring instrument and is capable of changing an operating mode to an adjustment mode in which an adjustment is carried out by using the results of measurements by the measuring instrument, the image processing apparatus comprising:
    a control section detecting whether the measuring instrument is connected to the interface section, and when the measuring instrument is detected, changing the operating mode to the adjustment mode,
    wherein the control section monitors an elapsed time after carrying out a last adjustment, and when a prescribed time has not elapsed at the time of detecting the connection with the measuring instrument, restricts changing to said adjustment mode.

6. A non-transitory computer readable recording medium storing a control program which causes a computer of an image processing apparatus that has an interface section for connecting a measuring instrument and is capable of changing an operating mode to an adjustment mode in which adjustment is carried out by using the results of measurements by the measuring instrument,
    to detect whether the measuring instrument is connected to the interface section, and change the operating mode to the adjustment mode,
    wherein the control program executes the computer to judge whether there is a processing under execution at the time of detecting the connection with the measuring instrument, changes the operating mode to the adjustment mode after the execution of the processing under execution is completed when the processing under execution is a particular processing that is determined in advance, and halts the operating mode under execution to change the operating mode to the adjustment mode when the processing under execution is not the particular process that is determined in advance.

7. The non-transitory computer readable recording medium storing the control program of claim 6,
    wherein the control program executes the computer to instruct an output of a printed material for carrying out measurements by the measuring instrument, after detecting the connection with the measuring instrument.

8. The non-transitory computer readable recording medium storing the control program of claim 6,
    wherein the control program executes the computer to carry out user authentication, when the user is authorized, change the operating mode to the adjustment mode, after detecting the connection with the measuring instrument.

9. The non-transitory computer readable recording medium storing the control program of claim 6,
    wherein the measuring instrument is one of a color measuring instrument, a density measuring instrument, and a digitizer.

10. A non-transitory computer readable recording medium storing a control program which causes a computer of an image processing apparatus that has an interface section for connecting a measuring instrument and is capable of changing an operating mode to an adjustment mode in which adjustment is carried out by using the results of measurements by the measuring instrument,
    to detect whether the measuring instrument is connected to the interface section, and change the operating mode to the adjustment mode,
    wherein the control program executes the computer to monitor an elapsed time after carrying out a last adjustment, and, if a prescribed time has not elapsed at the time of detecting the connection with the measuring instrument, to restrict changing to said adjustment mode.

* * * * *